W. T. Abell.
Spinning Mach.
No. 35,205. Patented May 13, 1862.
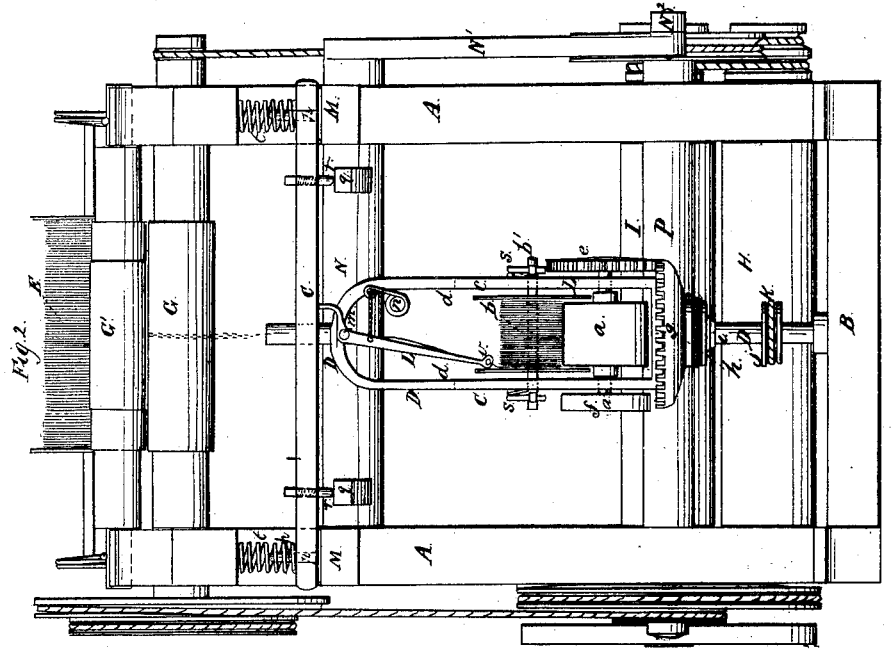
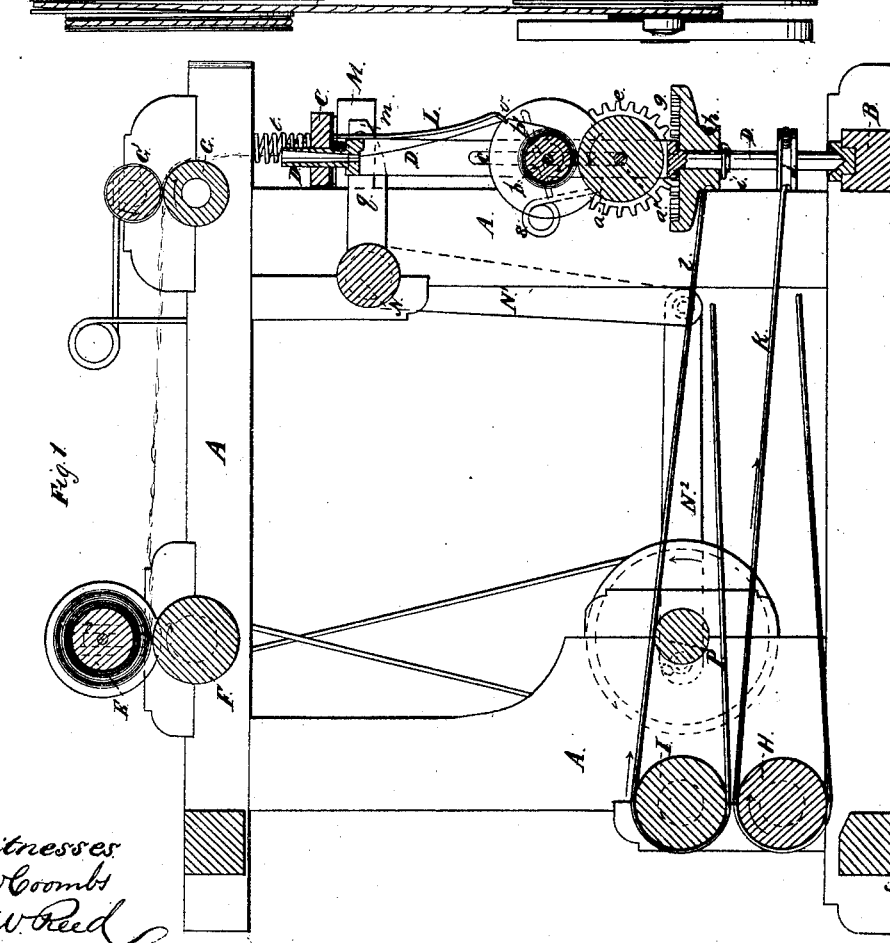
Witnesses
J. W. Coombs
G. W. Reed
Inventor
W. T. Abell

UNITED STATES PATENT OFFICE.

W. T. ABELL, OF VERNON, IOWA.

IMPROVEMENT IN MACHINERY FOR SPINNING WOOL.

Specification forming part of Letters Patent No. 35,205, dated May 13, 1862.

*To all whom it may concern:*

Be it known that I, W. T. ABELL, of Vernon, in the county of Van Buren and State of Iowa, have invented a new and useful Improvement in Machinery for Drawing and Spinning Wool and other Fibrous Materials; and I do hereby declare that the following is a full, clear, and exact description of the same, reference being had to the accompanying drawings, forming part of this specification, in which—

Figure 1 is a vertical section of a spinning-frame illustrating my invention. Fig. 2 is a front view of the same.

Similar letters of reference indicate corresponding parts in the two figures.

This invention relates to the combination of drawing and twisting mechanism to produce draft and twist simultaneously in the same portion of the roping or yarn.

It consists in a certain novel system of drawing mechanism applied directly to the spindle of a spinning-frame, whereby the simultaneous draft and twist are obtained with a more simple construction of the machinery than heretofore.

To enable those skilled in the art to fully understand and construct my invention, I will proceed to describe it.

A is the side framing.

B is the stationary step-rail containing the step-bearings for the bottoms of the spindles, and C is the guide-rail containing the guide-bearings for the upper parts thereof. Only one spindle, D, is represented.

E is the roping-spool, from which the roping is taken to be spun, resting upon and driven by the friction of a drum, F.

G G' are the first drawing-rolls, occupying a position above the spindles commonly occupied by the front drawing-rolls.

The drum F and rolls G G' may be driven in the usual or in any suitable manner.

The spindles D are each made with a wide opening, $d\ d$, in the manner represented in Fig. 2, for the reception of a drum, $a$, and spool $b$, which are fastened to shafts or axles $a'\ b'$, which pass through slots $c\ c$ in the sides of the opening $d\ d$ of the spindle. The bottoms of the slots $c\ c$ constitute bearings for the shaft or axle $a'$ of the drum $a$; but the shaft or axle $b'$ of the spool $b$ merely rotates in the slot, the spool always being caused to bear on the top of the drum $a$ by means of springs $s\ s$, attached to the sides of the spindle and pressing upon the portions of the shaft $a'$, which protrude through the outsides of the slots $c\ c$. The portion of the spindle above the opening $d\ d$ is hollow, for the passage of the roping from the drawing-rolls G G' to the spool $b$, upon which it is to be wound, the said spool deriving from the drum $a$ the rotary motion necessary to effect the winding. The shaft $a'$ of the drum is furnished at one end with a bevel-gear, $e$, and at the other with a wheel, $f$, which serves as a counterbalance to $e$ in the rotary motion of the spindle. The bevel-gear $e$ gears with a bevel-gear, $g$, which is fitted to turn loosely upon the spindle below the open part $d\ d$ thereof. This bevel-gear $g$ has rigidly attached to or formed in the same piece with it a grooved pulley, $h$, and both are supported by a collar, $i$, on the spindle. Below the pulley $h$ there is fast upon the spindle a pulley, $j$, which receives a driving-band, $k$, from a drum, H, similarly arranged to the spindle-driving drum commonly employed in spinning-frames. The pulley $h$ of the bevel-gear $g$ receives a driving-band, $l$, from a driving-drum, I, arranged near to H, and the bevel-gear derives from the said drum I, band $l$, and pulley $h$ a rotary motion at a velocity less or greater than that at which the spindle itself is driven, and by means of this differential velocity the said gear is caused to produce a rotary motion of the gear $e$ and drum $a$, and the drum is caused to drive the spool $b$ by the friction (produced by the springs $s\ s$) between the surface of the spool or the yarn upon it and the surface of the drum. The rotary motion of the spool $b$ causes the yarn to be wound upon it, as it is spun, by the revolution of the spindle.

The velocities of the drums H and I and sizes of the pulleys $h$ and $j$ must be so proportioned that the differential velocity of the spindle and gear $e$ is sufficient to drive the surface of the drum $a$ faster than the surfaces of the rolls G G', so that a draft is produced in the yarn between the spool $b$ and the said rolls, which is where the spinning is also taking place. The velocity at which the yarn is taken up on the spool is not affected by the quantity on the spool, as the velocity of the operating circumference of the spool—viz., the surface of the outer coils of yarn—is constant, the drum $a$ always acting on the said circumference. When the spool $b$ is full, it is enabled to be removed by drawing out the spindle $b'$, and after its removal another is to be substituted for it. The twist can be varied by changing the relative velocities of the drums H and I. The size of yarn can be varied by changing the velocity of the rolls G G' relatively to the drum F.

L $v$ is a vibrating guide attached to the upper part of the spindle for the purpose of guiding the yarn onto the spool $b$. This guide consists of a bent lever, L, having an eye, $v$, at its lower end for the yarn to pass through on its way from the hollow head of the spindle to the spool. This said guide is attached to the spindle above the opening $d\,d$ by means of the fulcrum-pin $m$, and its upper end is situated close under the guide-rail C, against which it is pressed in contact by a spring, $n$, connecting the lower part of the lever with the spindle. This rail instead of being stationary, as in other spinning-frames, is arranged to move up and down on vertical guides $p\,p$, secured in brackets M M, which are secured to the side framing, A A, below the rail C. Behind and some distance below the rail C there is arranged lengthwise of the spinning-frame in fixed bearings a rock-shaft, N, having arms $q\,q$, which project forward under the points of screws $r\,r$, which are screwed through the rail C, and to one end of the said rock-shaft there is secured an arm, N', which is connected by a rod, $N^2$, with a crank, O, Fig. 1, or a cam carried by a horizontal rotating shaft, P. Springs $t\,t$ are applied above the rail C to press it down, and either keep its screws $r\,r$ in contact with the arms $q\,q$ or keep the rail itself upon the brackets M M. The crank O or cam rotating continuously acts through the rod $N^2$ upon the arm N' of the rock-shaft N in such a manner as to produce an oscillating motion of the rock-shaft, by which its arms $q\,q$, acting in conjunction with the springs $t\,t$, are caused to produce a rising and falling movement of the rail C, which is thus caused so to act in conjunction with the spring $n$ upon the guide-lever L, as to cause its eye $v$ to traverse slowly back and forth opposite the spool $b$ in such manner as to direct the yarn upon the spool and cause it to be coiled thereon from one end to the other. A cam is better adapted than a crank, O, to produce a perfectly uniform coiling of the yarn upon the bobbin. The lower drawing-roll, G, may be made hollow and have steam applied to its interior to warm it and keep the oil melted on the wool in cold weather.

What I claim as my invention, and desire to secure by Letters Patent, is—

1. The arrangement within the spindle D of a spinning-frame of a spool, $b$, applied relatively to and operating, in combination with a pair of rolls, G G', substantially as and for the purpose herein specified.

2. Giving motion to the so-applied spool $b$ by means of a drum, $a$, arranged within the spindle, a gear, $e$, upon the said drum, and a gear, $z$, rotating loosely upon the spindle, substantially as herein specified.

3. The employment, in combination with the spindle containing the so-applied spool $b$, of a vibrating guide, L $v$, and a vertically-moving guide-rail, C, applied and operating together substantially as and for the purpose herein set forth.

W. T. ABELL.

Witnesses:
F. HANCOCK,
C. H. CAROTHERS.